United States Patent [19]

Römer et al.

[11] Patent Number: 5,366,663

[45] Date of Patent: Nov. 22, 1994

[54] MIXTURES OF LIQUID CRYSTALLINE COPOLYMERS, POLYETHER IMIDES AND COMPATIBILIZERS AND USE THEREOF

[75] Inventors: Michael Römer, Gross-Gerau; Andreas Schleicher, Einhausen, both of Germany

[73] Assignee: Hoechst AG, Frankfurt, Germany

[21] Appl. No.: 981,560

[22] Filed: Nov. 25, 1992

[30] Foreign Application Priority Data

Nov. 30, 1991 [DE] Germany ............... 4139532

[51] Int. Cl.$^5$ ............ C08L 67/00; C08L 77/12; C08L 79/08
[52] U.S. Cl. .................. 525/425; 525/420; 525/432; 525/436; 528/176; 528/194
[58] Field of Search ............ 525/420, 425, 432, 436; 528/176, 194

[56] References Cited

U.S. PATENT DOCUMENTS

| | | | |
|---|---|---|---|
| 4,161,470 | 7/1979 | Calundann | 528/190 |
| 4,250,279 | 2/1981 | Robeson | 528/176 |
| 4,299,756 | 11/1981 | Calundann | 528/176 |
| 4,448,937 | 5/1984 | Bopp et al. | 525/425 |
| 4,600,765 | 7/1986 | Lee | 528/190 |
| 4,614,790 | 9/1986 | Hutchings | 528/176 |
| 4,614,791 | 9/1986 | Hutchings | 528/176 |
| 4,835,047 | 5/1989 | Isayev et al. | 525/436 |
| 4,871,817 | 10/1989 | Rock | 525/425 |
| 4,879,354 | 11/1989 | Harris | 525/436 |
| 5,084,526 | 1/1992 | Harris | 525/436 |
| 5,135,900 | 8/1992 | Bookbinder et al. | 525/425 |

FOREIGN PATENT DOCUMENTS 0126928 12/1984 European Pat. Off. .
0278066 8/1988 European Pat. Off. .
0291323 11/1988 European Pat. Off. .

OTHER PUBLICATIONS

"Reactive Extrusion", Encyclopedia of Polymer Science and Engineering, vol. 14, 1985 John Wiley & Sons, Inc., S. B. Brown et al.
Chemical Abstracts vol. 116, No. 26 Jun. 29, 1992 abstract #25 6897r.

*Primary Examiner*—Morton Foelak
*Assistant Examiner*—P. Hampton-Hightower
*Attorney, Agent, or Firm*—Connolly and Hutz

[57] ABSTRACT

Mixtures of liquid crystalline copolymers, polyether imides and compatibilizers and use thereof.

Mixtures of at least one A) liquid crystalline copolymer, at least one B) polyether imide and at least one C) compatibilizer where the proportions of components A) and B) are each from 5 to 95 % by weight, based on the sum total of the two components, and the proportion of the compatibilizer C) is from 0.5 to 10 % by weight, based on the mixture of A) and B), have improved breaking strength and extension values.

They are therefore highly suitable for producing molded articles or for use as matrix material for composites.

17 Claims, No Drawings

MIXTURES OF LIQUID CRYSTALLINE COPOLYMERS, POLYETHER IMIDES AND COMPATIBILIZERS AND USE THEREOF

Mixtures of liquid crystalline copolymers, polyether imides and compatibilizers and use thereof.

The invention relates to mixtures of liquid crystalline copolymers, polyether imides and compatibilizers having improved values for the percentage elongation at break and tensile strength at break, and their use.

The synthesis and properties of liquid crystalline copolyesters (LCP) and copolyesteramides are the subject of numerous publications. A conventional process for their production is melt condensation of the starting compounds, which guarantees a high purity and a high molecular weight of the polymers (U.S. Pat. Nos. 4,161,470; 3,637,595).

In recent times interest in liquid crystalline polyesters has increased, as is demonstrated by the appearance of a number of publications (EP-A-0,394,813; EP-A-0,390,489). All these publications refer to the unusual mechanical and rheological properties of the materials, particular prominence being given to their high moduli of elasticity and also to their outstanding flowability at high shear rates.

However, neither the tensile strength at break nor the percentage elongation at break are sufficient for many applications. Moreover, these disadvantages cannot be obviated (EP-A-0,278,066) by adding amorphous polymers, for example polyether imides (PEI), to the LCPs.

The object of the present invention is to improve the values of the tensile strength at break and percentage elongation at break of such mixtures.

It is also known from the literature that the addition of compatibilizers to polymer blends can improve the properties of these blends (S. B. Brown, C. M. Orlando, "Reactive Extrusion", Encycl. Polym. Sci. Eng. Vol. 14, 1988; K, Kreisher, "Plastics Technology", February 1989 "Compatibilizers and reactive compounding"). However, it is still impossible to reliably predict the properties that can be achieved by such an addition. The addition of such substances is thus largely empirical as regards the results.

It has been found that the aforementioned object is achieved by adding specific compatibilizers to blends of liquid crystalline copolyesters or copolyester amides and polyether imides. These modified blends have mechanical properties that are superior to those of the blend alone or the individual components.

The invention accordingly provides a mixture of in each case at least A) a liquid crystalline copolymer, B) a polyether imide, and C) a compatibilizer.

The liquid crystalline polymers A) used in the mixtures according to the invention are in general wholly aromatic polyesters that form anisotropic melts and have mean molecular weights (Mw=mean weight) from 2000 to 200,000, preferably from 3500 to 50,000, and in particular from 4000 to 30,000 g/mol. A suitable class of liquid crystalline polymers for the mixtures according to the invention is described in U.S. Pat. No. 4,161,470. These polymers are naphthoyl copolyesters with recurring structural units of the formulae I and II

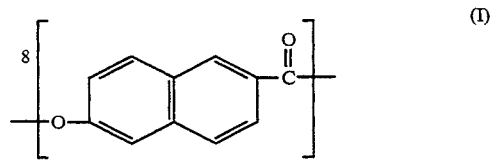

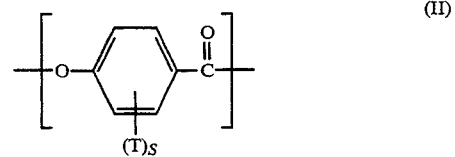

where T is selected from an alkyl radical, an alkoxy radical, in each case with 1 to 4 carbon atoms, or a halogen, preferably chlorine, bromine or fluorine, s is zero or the integer 1, 2, 3 or 4, and in the case of a plurality of radicals T these are, independently of one another, the same or different. The naphthoyl copolyesters contain 10 to 90, preferably 25 to 45, mol % of structural units of formula I, and 90 to 10, preferably 85 to 55, mol % of structural units of the formula II.

Further liquid crystalline polyesters used for the mixtures according to the invention are described in EP-A-0,278,066 and U.S. Pat. No. 3,637,595. The oxybenzoyl copolyesters disclosed in these publications contain structural units of the formulae III, IV and V, one or more of the mentioned structural units being able to be present in each case.

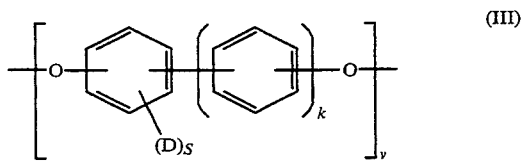

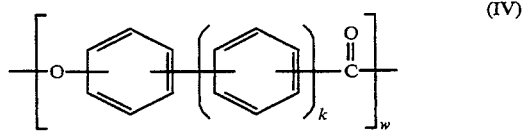

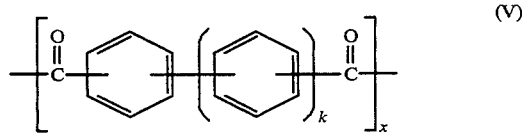

In the formulae III, IV and V k is zero or 1, v, w and x are integers equal to or greater than 1, D is selected from an alkyl radical with 1 to 4 carbon atoms, an aryl radical, an aralkyl radical with in each case 6 to 10 carbon atoms, or a halogen such as fluorine, chlorine or bromine, and s has the abovementioned meaning, in which connection in the case of a plurality of radicals D these may, independently of one another, be identical or different. The sum of the indices v, w and x has values from 30 to 600. The oxybenzoyl copolyesters generally contain 0.6 to 60, preferably 8 to 48, mol % of structural units of the formula III, 0.4 to 98.5, preferably 5 to 85, mol % of structural units of the formula IV, and 1 to 60, preferably 8 to 48, mol % of structural units of the formula V, the proportions of the structural units of the formulae III, IV and V totaling 100 mol %.

Copolyesters that contain only structural units of the formulae III and V are also suitable for the mixtures. These liquid crystalline polymers generally contain 40 to 60 mol % of structural units of the formula III and 60 to 40 mol % of structural units of the formula V. A molar ratio of 1:1 is preferred in this connection. Such polyesters are described for example in U.S. Pat. Nos. 4,600,765; 4,614,790 and 4,614,791.

Copolyesters that also contain structural units of the formulae I and/or II in addition to structural units selected from formulae III to V are likewise suitable, for example those with a proportion of structural units of the formula I of from 15 to 1 mol %, of formula II of from 50 to 79 mol %, of formula III of from 20 to 10 mol %, and of formula V of from 20 to 10 mol %.

For the mixtures according to the invention copolyester amides are also suitable that contain, in addition to one or more structural units of formulae I to V, also at least one structural unit of the formula VI

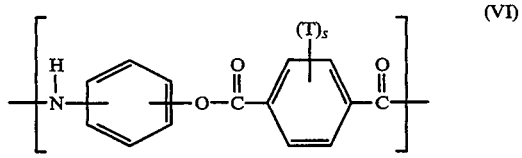

(VI)

where T and s have the meanings given above.

The blends according to the invention contain as component B) polyether imides with recurring units of the formula:

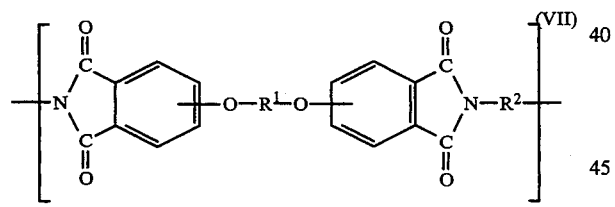

(VII)

where $R^1$ is selected from a substituted or unsubstituted aromatic radical of the formula

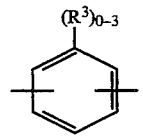

or

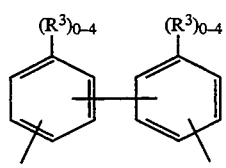

or a divalent radical of the formula

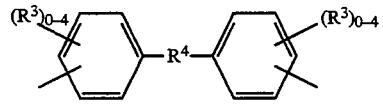

in which $R^3$ is $C_1$-$C_6$-alkyl or halogen such as fluorine, chlorine or bromine, and $R^4$ is a direct bond or a divalent —O—, —S—, —CO—, —SO$_2$— or —SO radical, alkylene or alkylidene or with in each case 1 to 6 carbon atoms, or cycloalkylene and cycloalkylidene with in each case 4 to 8 carbon atoms. $R^2$ is an aromatic hydrocarbon radical with 6 to 20, preferably 6 to 12, carbon atoms, or a halogen-substituted or alkyl-substituted derivative thereof, the alkyl group containing 1 to 6 carbon atoms, an alkylene or cycloalkylene radical with 2 to 20, preferably 2 to 6, carbon atoms, or a divalent radical of the formula

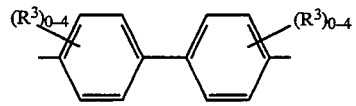

where $R^3$ has the above meaning.

Further polyether imides that may be used as blending constituent include those with the following recurring units of the formula

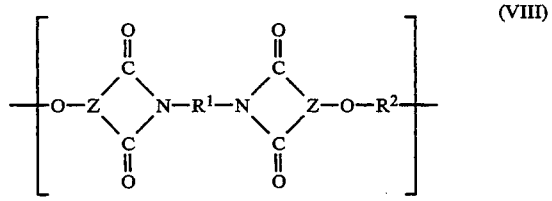

(VIII)

in which $R^1$ and $R^2$ are as defined above, and where

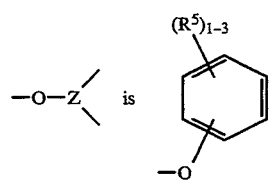

$R^5$ in the —O—Z= radical is, independently of one another, hydrogen, alkyl or alkoxy with 1 to 6 carbon atoms in the alkyl radical, or is

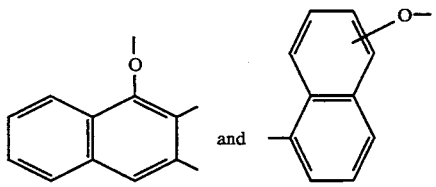

where the oxygen atom is coupled to one of the rings and is in the ortho- or para- position to one of the bonds of the imidocarbonyl group.

A preferred polyether imide contains the recurring units

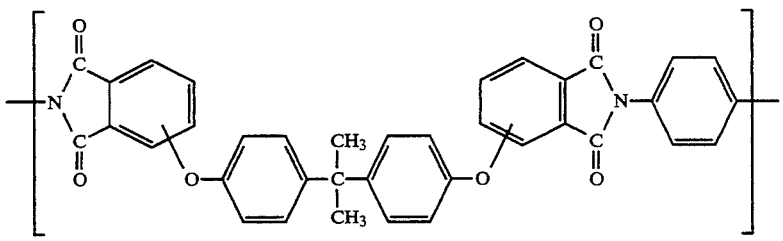

The term polyether imide includes homopolymers, random copolymers, terpolymers and block copolymers. The polyether imides used have Staudinger indices of 0.1 to 3, preferably 0.3 to 1.5, and in particular 0.3 to 1 dl/g measured at 25° C. in N-methylpyrrolidone or methylene chloride.

The polyether imides used according to the invention are known (U.S. Pat. No. 3,847,867; 3,847,869; 3,850,885; 3,852,242; 3,855,178; 3,887,558; 4,017,511; 4,024,110; 4,250,279).

The compatibilizers C) used according to the invention are aryl and alkyl compounds or mixtures of aryl and alkyl compounds with at least two functional groups and capable of undergoing condensation.

A preferred class of compatibilizers is composed of structural units of the formula IX:

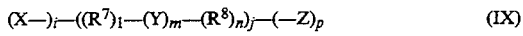

$$(X-)_i-((R^7)_l-(Y)_m-(R^8)_n)_j-(-Z)_p \qquad (IX)$$

where X and Z are identical or different and are, independently of one another, a hydroxyl or amino group, or —COOH, —CO—O—CO— or —COOR, the indices i and p are in each case identical or different and are integers, the sum of the two indices being 2 to 10, preferably 2 to 6, $R^7$ and $R^8$ are in each case identical or different and are alkyl radicals with 1 to 8, preferably 1 to 4, carbon atoms, or aryl radicals with 6 to 30, preferably 6 to 12, carbon atoms, or mixtures of the two, the indices l and n are zero or 1, the sum of the two indices being at least 1, Y is a divalent O, C=O, $SO_2$, SO, S or $NR^9$ group, $R^9$ being a substituted or unsubstituted alkyl or aryl group with 1 to 18, preferably 1 to 6, carbon atoms, m is zero or 1 and j is the integer 1, 2 or 3. Examples of such compounds are preferably para-aminobenzoic acid (PABA) and pyromellitic dianhydride (PMDA).

The proportion of the polyether imides B) in the mixtures is 5 to 95% by weight, preferably 5 to 50% by weight, and the proportion of liquid crystalline polyesters (A) is 95 to 5%, preferably 95 to 50% by weight, based on the sum of the components A and B. The proportion of compatibilizers C) in the mixtures, based on the overall polymer mixture, is 0.5 to 10% by weight, preferably 0.5 to 5% by weight. The mixtures according to the invention may contain at least one polyether imide, at least one liquid crystalline polyester and at least one compatibilizer, and also modified polyether imides and modified liquid crystalline polyesters.

The mixtures according to the invention are produced and processed by known standard methods conventionally used for thermoplastics, for example by kneading, extrusion, compression molding or injection molding.

The mixtures may additionally contain conventional additives, for example heat stabilizers, UV stabilizers, antistats, flameproofing agents, dyes, pigments, inorganic and organic fillers, i.e. in particular also reinforcing additives such as glass, carbon or high modulus fibers. The mixtures are suitable for producing molded articles, for example in the form of tiles, fibers, sheeting-/film, plug connector strips and tubing, produced by the injection molding or extrusion method, and in particular are also suitable as matrix material for composites.

The following materials were used in the examples:
(A1) Liquid crystalline copolymers with structural units of the formula

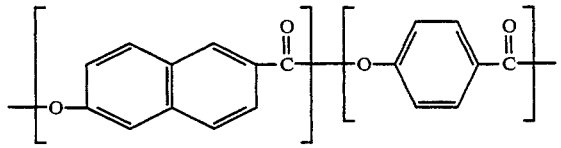

where the proportion of oxynaphthoyl structural units is 20 mol % and the proportion of oxybenzoyl structural units is 80 mol %.

The employed polyether imide (B) contains recurring units of the formula

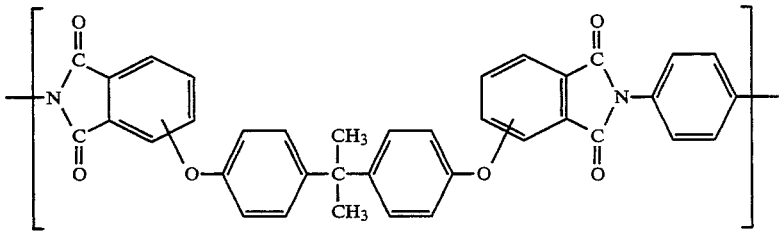

As compatibilizers para-aminobenzoic acid (PABA) and pyromellitic dianhydride (PMDA) were used.

The materials were first of all dried (140° C., 24 hours) and then kneaded in various weight ratios in a Rheocord System 90/Rheomix 600 type kneader, manufactured by Haake (Karlsruhe, Federal Republic of Germany) under an inert gas (nitrogen) at temperatures of 310° C. to 340° C., and the mixtures obtained were processed into molded parts such as shoulder bars or tiles and their physical and thermal properties were investigated. The following machines were used for this purpose:

A 43.02 H 3570 type tension-elongation machine, manufactured by Instron (Offenbach/Main, Federal Republic of Germany), to measure the tensile strength at break and the percentage elongation at break and the elastic modulus in tension.

A DSC7 type calorimeter, manufactured by Perkin-Elmer (Überlingen, Federal Republic of Germany), to determine the thermal properties.

EXAMPLES 1) 60% by weight of the liquid crystalline copolyester (A1), 40% by weight of the polyether imide, and also different amounts by weight of PABA were thoroughly dried and kneaded together under nitrogen using the aforementioned kneader. The kneaded composition was then thoroughly dried and processed into pressed tiles. Shoulder bars were milled out from these tiles. Table 1 shows the mechanical properties of the mixtures determined therefrom.

TABLE 1

| (A1):B:PABA | 60:40:0 | 60:40:2 | 60:40:4 |
|---|---|---|---|
| Tensile strength at break (MPa) | 33 | 51 | 37 |
| Percentage elongation at break (%) | 1.6 | 3.2 | 1.8 |
| Elastic modulus in tension (MPa) | 2310 | 3000 | 2500 |

Table 2 shows the determined thermal properties of the mixtures:

TABLE 2

| (A1):B:PABA | 60:40:0 | 60:40:2 | 60:40:4 |
|---|---|---|---|
| Glass transition temperature (°C.) | 209 | 203.8 | 203 |
| Melting point (°C.) | 333 | 327 | 329 |
| Melt enthalpy (J/g) | 0.9 | 15 | 1.1 |

2) 60% by weight of the liquid crystalline copolyester (A1), 40% by weight of the polyether imide B) as well as different amounts by weight of PMDA were thoroughly dried and kneaded together under nitrogen using the kneader and procedures described in Example 1. The kneaded composition was then thoroughly dried and processed into pressed sheets. Shoulder bars were milled out from these sheets. Table 3 shows the mechanical properties of the mixtures determined therefrom.

TABLE 3

| (A1):B:PMDA | 60:40:0 | 60:40:2 | 60:40:4 |
|---|---|---|---|
| Tensile strength at break (MPa) | 33 | 43 | 33 |
| Percentage elongation at break (%) | 1.6 | 1.8 | 1.6 |
| Elastic modulus in tension (MPa) | 2310 | 3100 | 2600 |

Table 4 shows the measured thermal properties of the mixtures:

TABLE 4

| (A1):B:PMDA | 60:40:0 | 60:40:2 | 60:40:4 |
|---|---|---|---|
| Glass transition temperature (°C.) | 209 | 209 | 210 |
| Melting point (°C.) | 333 | 320 | n.d. |
| Melt enthalpy (J/g) | 0.9 | 0.5 | n.d. | n.d.: not determinable

What is claimed is:
1. A mixture comprising
   A) at least one liquid crystalline polyester or poly(esteramide),
   B) at least one polyether imide with recurring units of the formulae:

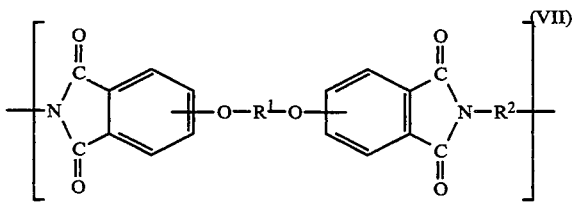

where $R^1$ is selected from a substituted or unsubstituted aromatic radical of the formula

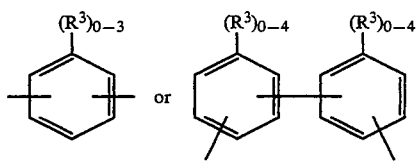

or a divalent radical of the formula

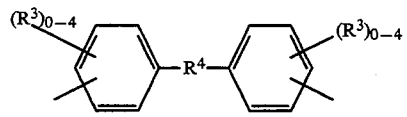

in which $R^3$ is $C_1$–$C_6$-alkyl or halogen and $R^4$ is a direct bond or a divalent —O—, —S—, —CO—, —SO$_2$— or —SO radical, alkylene or alkylidene with in each case 1 to 6 carbon atoms, or cycloalkylene or cycloalkylidene with in each case 4 to 8 carbon atoms, $R^2$ is an aromatic hydrocarbon radical with 6 to 20 carbon atoms, or a halogen-substituted or alkyl-substituted derivative thereof, the alkyl group containing 1 to 6 carbon atoms, an alkylene or cycloalkylene radical with 2 to 20 carbon atoms, or a divalent radical of the formula

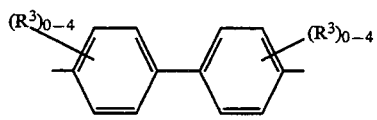

where $R^3$ has the above meaning or b)

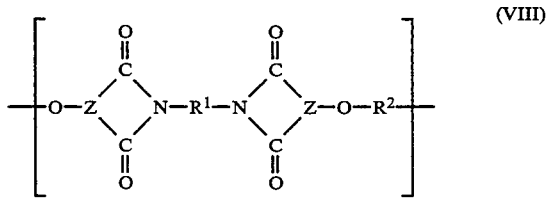

in which $R^1$ and $R^2$ are as defined above, and where

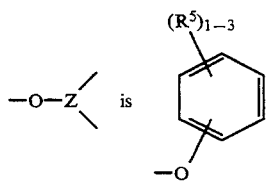 is $R^5$ in the —)—Z=radical is, independently of one another, hydrogen, alkyl or alkoxy with 1 to 6 carbon atoms in the alkyl radical, or is

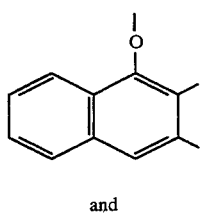

and

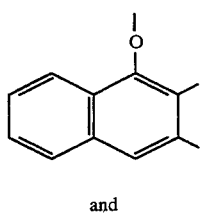

where the oxygen atom is coupled to one of the rings and is in the ortho- or para-position to one of the bonds of the imidocarbonyl group, and C) at least one compatibilizer which contains structural units of the formula

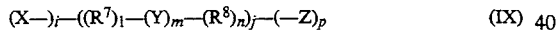 (IX)

X and Z are identical or different and are, independently of one another, a hydroxyl or amino group, or —COOH, —CO—O—CO— or —COOR, i and p are in each case identical or different and are integers, the sum of the two indices being 2 to 10, $R^7$ and $R^8$ are in each case identical or different and are alkyl radicals with 1 to 8 carbon atoms or aryl radicals with 6 to 30 carbon atoms or mixtures of the two, 1 and n are zero or 1, the sum of the two indices being at least 1, Y is a divalent O, C=O, $SO_2$, SO=, S or $NR^9$ group, $R^9$ being a substituted or unsubstituted alkyl or aryl group with 1 to 18 carbon atoms, m is zero or 1, and j is the integer 1, 2 or 3.

2. A mixture as claimed in claim 1, wherein the proportion of components A) and B) is in each case 5 to 95% by weight, based on the sum of the two components, and the component C) is used in amounts of 0.5–10% by weight, based on the polymer mixture A) and B).

3. A mixture as claimed in claim 1, wherein component A) is an aromatic polyester with a mean molecular weight of 200 to 200,000 or a copolyester amide.

4. A mixture as claimed in claim 1, wherein component A) has recurring units of the formulae

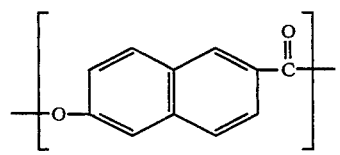 (I)

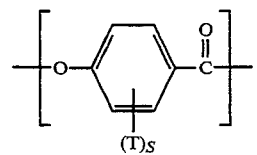 (II)

where T is identical or different and is selected from an alkyl radical, an alkoxy radical, in each case with 1 to 4 carbon atoms, or a halogen, s is zero or the integer 1, 2, 3 or 4, and the ratio of the units (I) and (II) is 10 to 90 to 90 to 10 mol percent.

5. A mixture as claimed in claim 1, wherein component A) contains at least two recurring units of the formulae

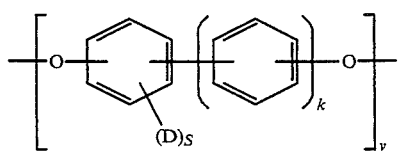 (III)

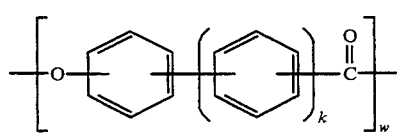 (IV)

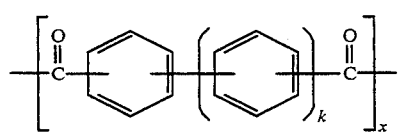 (V)

in which k is zero or 1, v, w, and x are integers equal to or greater than 1, and D is identical or different and is selected from an alkyl radical with 1 to 4 carbon atoms, an aryl radical, an aralkyl radical, in each case with 6 to 10 carbon atoms, or a halogen.

6. A mixture as claimed in claim 5, wherein the sum of the index numerals v, w and x is 30 to 600, and the proportion of the units is 0.6 to 60 mol % (III), 0.4 to 98.5 mol % (IV) and 1 to 60 mol % (V), based on 100 mol %.

7. A mixture as claimed in claim 5, wherein a component A) is composed of 40 to 60 mol % of units (III) and 40 to 60 mol % of units (V).

8. A mixture as claimed in claim 1, wherein component A) contains at least one recurring unit of the recurring units of the formulae

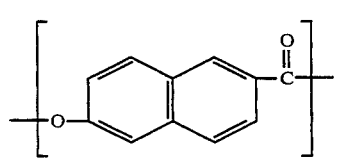 (I)

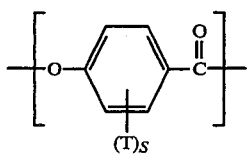

where the T radicals are identical or different and are alkyl, alkoxy, in each case with 1 to 4 carbon atoms, or halogen, and s is zero or the integer 1, 2, 3, or 4,

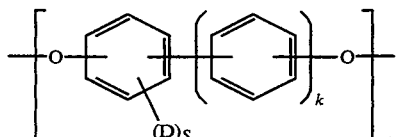

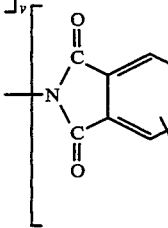

in which k is zero or 1; v, w, and x are integers equal to or greater than 1, and the D radicals are identical or different and are alkyl with 1 to 4 carbon atoms, aryl, aralkyl, in each case with 6 to 10 carbon atoms, or halogen, and s is zero or the integer 1, 2, 3, or 4.

9. A mixture as claimed in claim 8, wherein component A) additionally contains, as well as units (I) to (V), at least one structural unit

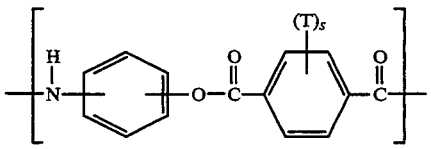

where T and s have the aforementioned meanings.

10. A mixture as claimed in claim 8, wherein component A) contains the structural units: (I) 1 to 15 mol %, (II) 50 to 79 mol %, (III) 10 to 20 mol %, and (V) 10 to 20 mol %, the sum of all units always totaling 100 mol %.

11. A mixture as claimed in claim 1, wherein the polyether imide contains the recurring units 12. A mixture as claimed in claim 1, wherein the mixture contains at least one of the compounds para-aminobenzoic acid or pyromellitic dianhydride as component C).

13. A mixture as claimed in claim 1, which additionally contains heat stabilizers, UV stabilizers, flameproof agents, dyes, pigments, antistatics or reinforcing additives.

14. Molded article in the form of tiles, plug connector strips or a matrix material for composites produced from the mixture as claimed in claim 1.

15. A mixture as claimed in claim 1, wherein the sum of said indices i and p is 2 to 6, and wherein $R^7$ is a said aryl radical, 1 is 1, n is zero, m is zero, j is 1, and X an Z are, independently of each other, a hydroxyl group, an amino group, or the group —CO—O—CO—; the amount of said component C being 0.5 to 10% by weight, based on the weight of the mixture of components A and B.

16. A mixture comprising the following components:
A. at least one liquid crystalline polymer,
B. at least one polyether imide, and
C. 0.5 to 5% by weight, based on the combined weight of components A and B, of at least one compatibilizer of the formula $(X-)_i-(R^7)-(-Z)_p$ where
X and Z are identical or different and are, independently of each other, a hydroxyl group, and amino group or a —CO—O—CO— group, and
$R^7$ is an aryl radical of 6 to 12 carbon atoms and the sum of said indices i and p is 2 to 6.

17. The mixture as claimed in claim 1, which additionally contains heat stabilizers, anti-statics or reinforcing additives.

* * * * *